United States Patent
Foltin

(10) Patent No.: US 11,084,442 B2
(45) Date of Patent: Aug. 10, 2021

(54) METHOD AND DEVICE FOR ADAPTING A TRIGGERING ALGORITHM OF A PERSONAL RESTRAINT MEANS OF A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 15/921,362

(22) Filed: Mar. 14, 2018

(65) Prior Publication Data

US 2018/0272979 A1 Sep. 27, 2018

(30) Foreign Application Priority Data

Mar. 23, 2017 (DE) .................. 102017204936.7

(51) Int. Cl.
  *B60R 21/015* (2006.01)
  *B60R 21/0134* (2006.01)
  *B60R 21/01* (2006.01)

(52) U.S. Cl.
  CPC .... *B60R 21/01538* (2014.10); *B60R 21/0134* (2013.01); *B60R 21/01552* (2014.10); *B60R 2021/01211* (2013.01)

(58) Field of Classification Search
  CPC ........ B60R 21/01538; B60R 21/01552; B60R 21/0134; B60R 2021/01211
  USPC .......................................................... 701/45
  See application file for complete search history.

(56) References Cited

U.S. PATENT DOCUMENTS

2006/0217864 A1* 9/2006 Johnson ................. B60N 2/067
                                                        701/45
2010/0302022 A1* 12/2010 Saban ..................... B60N 2/002
                                                      340/459

* cited by examiner

*Primary Examiner* — Paula L Schneider
(74) *Attorney, Agent, or Firm* — Norton Rose Fulbright US LLP; Gerard Messina

(57) ABSTRACT

A method for adapting a triggering algorithm of a personal restraint device of a vehicle is described. The method includes at least one step of reading in and a step of outputting. In the step of reading in, an object signal is read in that represents a recognition of a mobile object situated in the area of a person in the vehicle during a trip. In the step of outputting, a control signal is outputted that is designed to modify the triggering algorithm of the personal restraint device using the object signal.

16 Claims, 3 Drawing Sheets

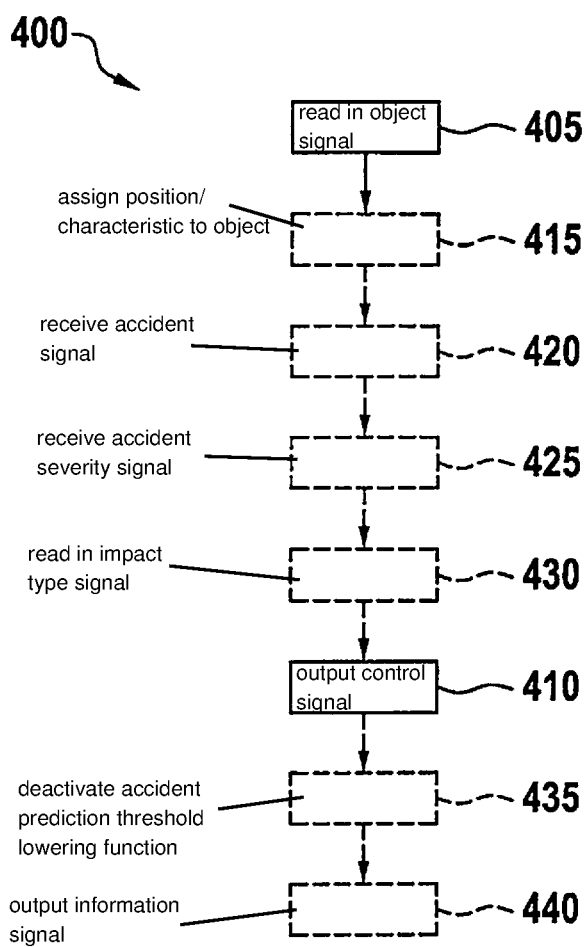

METHOD AND DEVICE FOR ADAPTING A TRIGGERING ALGORITHM OF A PERSONAL RESTRAINT MEANS OF A VEHICLE

CROSS REFERENCE

The present application claims the benefit under 35 U.S.C. § 119 of German Patent Application No. DE 102017204936.7 filed on Mar. 23, 2017, which is expressly incorporated herein by reference in its entirety.

BACKGROUND INFORMATION

The present invention relates to a device and a method. The present invention also relates to a computer program.

In an accident prediction threshold lowering function, such as IDF, or Integrated Collision Detection Front, an environmental sensor of a vehicle predicts an accident, and lowers a triggering threshold for an airbag in a time window around the predicted time of the collision. In this way, accidents that are frequently difficult to recognize, e.g., crashes into poles or running under a truck, can be recognized faster and more reliably. Due to automated driving, more and more people will be interacting with objects in a vehicle during a trip, such as laptops, tablet PCs, and/or musical instruments.

SUMMARY

In accordance with the present invention, a method is provided for adapting a triggering algorithm of a personal restraint device of a vehicle, and a device that uses this method, as well as, finally, a corresponding computer program.

In accordance with the present invention, a risk of injury to a person in a vehicle by objects that are thrown around is prevented or at least reduced.

A method is presented for adapting a triggering algorithm of a personal restraint device of a vehicle. The method includes at least one step of reading in and one step of outputting. In the step of reading in, an object signal is read in that represents a recognition of a mobile object situated in the area of the person in the vehicle during travel. In the step of outputting, a control signal is outputted that is designed to modify the triggering algorithm of the personal restraint device, using the object signal.

A personal restraint device can be a personal protection device such as an airbag, triggered in order to protect a person during an accident. The triggering algorithm of the personal restraint device can be, specifically, an activation threshold of the personal restraint device. A method presented here can prevent the person from being injured after a triggering of the airbag by a mobile object that the person was for example holding in his/her hand up to that time, or that was at or in the area of an airbag opening and could be accelerated in the direction of the person by the airbag.

Accordingly, it is advantageous if, in the step of reading in, the object signal is read in, which signal represents a recognition of a mobile object held by the person, and/or of a mobile object situated in the area of an airbag in the vehicle during travel, because in one of these areas a contact of the mobile object with the person after a triggering of the personal protection device is highly probable.

Here, in the step of reading in, the object signal can be read in using a, or by at least one, interior compartment camera situated in the vehicle. Here, the object signal can be read in by an interior compartment camera that is equipped with an object recognition capability and/or is situated to monitor a relevant area in the interior of the vehicle. In addition or alternatively, in the step of reading in the object signal can however also be read in using a, or by at least one other, interior compartment sensor that is designed to recognize a mobile object.

According to an advantageous specific embodiment, the method can have a step of assignment that is carried out in response to the step of reading in, at least one position in the vehicle and/or a characteristic being assigned to the recognized mobile object in the step of assignment, and in the step of outputting, the control signal can be outputted, this signal being designed to modify the triggering algorithm of the personal restraint device using the position and/or the characteristic. In the step of assignment, for example a position in the vehicle at the airbag can be assigned to the recognized mobile object in order to make it possible to estimate a risk of the object being accelerated by the airbag after the triggering. The characteristic can be a degree of danger defined for example by determining a weight and/or a shape and/or a material of the mobile object. For example, a higher degree of danger to the person can be assigned to a mobile object that is heavy and/or has sharp edges and/or is hard. The step of outputting can then be carried out using the degree of danger.

In the step of outputting, the control signal can be outputted, which signal is designed to set an activation threshold of the personal restraint device to be less sensitive or more robust in the triggering algorithm of the personal restraint device (for example by raising an activation threshold that is to be exceeded for a triggering). This can take place for example when, in the step of reading in, it is recognized that the person is interacting with the mobile object, independently of whether an impending accident has been recognized. This has the advantage that an adaptation is made independent of an estimated accident time, and in this way a triggering can be robustly suppressed.

For example, this can take place in particular when, in the step of reading in, a mobile object has been recognized to which a high degree of danger was assigned in the step of assignment, because the object is for example heavy and/or has sharp edges and/or is hard. A mobile object having such a characteristic could injure the person when the airbag is triggered.

According to a further specific embodiment, in the step of outputting the control signal is outputted, which signal is designed to suppress a triggering of the personal restraint device for at least a period of time. The period of time can for example be at least one accident time, calculated by an accident prediction device of the vehicle, for example having a tolerance range of for example 0.05 to 3 seconds before the accident time, at which time the personal restraint device would otherwise be triggered. In this way, a specific impending triggering of the personal restraint device can be actively suppressed.

For this purpose, it is advantageous if the method has a step of receiving an accident signal that represents an impending accident, determined by the accident prediction device, and/or represents the accident time, the step of outputting being capable of being carried out using the accident signal.

Moreover, the method can have a step of deactivation, in which for example an already-existing accident prediction threshold lowering function of the accident prediction device is deactivated, if the vehicle has such a function. The accident prediction threshold lowering function can for example be a standard function of a known IDF device. The step of deactivation can for example be carried out in response to the step of reading in.

It is further advantageous if the method has a step of further reception of an accident severity signal that represents a calculated severity of the impending accident, or of an accident that is for example determined to be impending by the accident prediction device, such that in the step of outputting the control signal can be outputted, which signal is designed to modify the triggering algorithm of the personal restraint device using the accident severity signal. Accordingly, in the step of outputting the triggering of the personal restraint device can for example not be suppressed if, in the step of the further receiving, received impact parameters indicate that a severe accident is impending. In this way, it can be ensured that the person is safely protected by the personal restraint device in the usual fashion in the impending severe accident. If only a mild and/or moderate accident is impending, the triggering of the personal restraint device can be suppressed.

The step of deactivation can correspondingly also for example be carried out only when an accident severity signal is received that indicates a mild or moderate impending accident.

If the method additionally or alternatively has a step of determining a type of impact of a, or the, impending accident, using at least one read-in driving parameter signal of the vehicle, or has a step of further reading in of an impact type signal, which signal for example represents a type of impact, determined by the accident prediction device, of a, or the, impending accident, this can enable the outputting, in the step of outputting, of the control signal, which is designed to modify the triggering algorithm of the personal restraint device using the determined type of impact. Here, the driving parameter signal can represent at least one read-in type of the other party to the accident and/or impact angle and/or a read-in relative speed and/or mass and/or rigidity and/or impact position and/or geometry of the other party and/or degree of overlap, through which the impact type is determinable or is determined. A determined impact type can for example be an accident with complete overlapping, referred to as a full frontal crash, or an accident with a partial overlapping, referred to as an low overlap crash, or an angular impact, also called an angular crash. The angular impact is an accident in which two vehicles involved in the accident have an angle relative to one another during the impact that is different from 0° or 180°.

In the step of outputting, the control signal can be outputted, which signal is designed to suppress a triggering of the personal restraint device if, in the step of determining, the impact type is determined and represents an impending accident with overlapping or angular impact, or in the step of further reading in the impact type signal is read in in which the determined impact type represents the impending accident with overlapping or angular impact. This is advantageous because, in the case of an accident with overlapping or an angular accident, a rotation of the vehicle is to be expected, which can be expected to have the result that the person will miss a triggered airbag, or will not meet it centrally. Because an airbag triggered in such a case would in any case not protect the person, a triggering of the personal restraint device could even be disadvantageous, because it involves the already-discussed risk of accelerating the mobile object against the person. Thus, this is helpful when it has been reliably determined that the person will not be protected by the personal protection device through a triggering of the personal protection device.

In order to inform the person of a modified triggering algorithm, it is advantageous if the method has, according to a specific embodiment, a step of informing, in which, in response to the step of outputting, an information signal is outputted for optical display and/or acoustic reproduction of the modified triggering algorithm, so as to be perceptible by the person.

This method can for example be implemented in software or hardware, or in a mixed form of software and hardware, for example in a control device.

The approach presented here also provides a device that is designed to carry out, control, or implement the steps of a variant of a method presented here in corresponding devices. Through this variant embodiment of the approach in the form of a device as well, the object underlying the approach can be achieved quickly and efficiently.

For this purpose, the device can have at least one computing unit for processing signals or data, at least one memory unit for storing signals or data, at least one interface to a sensor or to an actuator for reading in sensor signals from the sensor or for outputting data or control signals to the actuator, and/or at least one communication interface for reading in or outputting data that are embedded in a communication protocol. The computing unit can for example be a signal processor, a microcontroller, or the like, and the memory unit can be a flash memory, an EPROM, or a magnetic memory unit. The communication interface can be designed to read in or output data wirelessly and/or in wire-bound fashion, and a communication interface that can read in or output wire-bound data can read in these data for example electrically or optically from a corresponding data transmission line or can output them to a corresponding data transmission line.

In the present context, a device can be understood as an electrical apparatus that processes sensor signals and outputs control signals and/or data signals as a function thereof. The device can have an interface that can be designed as hardware and/or as software. In the case of a realization as hardware, the interfaces can for example be part of a so-called system ASIC containing a wide variety of functions of the device. However, it is also possible for the interfaces to be separate integrated circuits, or to be made up at least partly of discrete components. In the case of a realization as software, the interfaces can be software modules present on a microcontroller alongside other software modules.

In an advantageous embodiment, the device carries out a controlling of a control signal. For this purpose, the device can for example access sensor signals, such as at least the object signal. The controlling takes place via actuators, such as a read-in device and an output device.

Also advantageous is a computer program product or computer program having program code that can be stored on a semiconductor memory, a hard drive memory, or an optical memory, and is used to carry out, implement, and/or control the steps of the method according to one of the specific embodiments described above, in particular when the program product or program is executed on a computer or on a device.

Exemplary embodiments of the approach presented here are shown in the figures and are explained in more detail below.

BRIEF DESCRIPTION OF THE DRAWINGS

FIG. 4 shows a flow diagram of a method for adapting a triggering algorithm of a personal restraint device of a vehicle, according to an exemplary embodiment.

DETAILED DESCRIPTION OF EXAMPLE EMBODIMENTS

Figure 1:
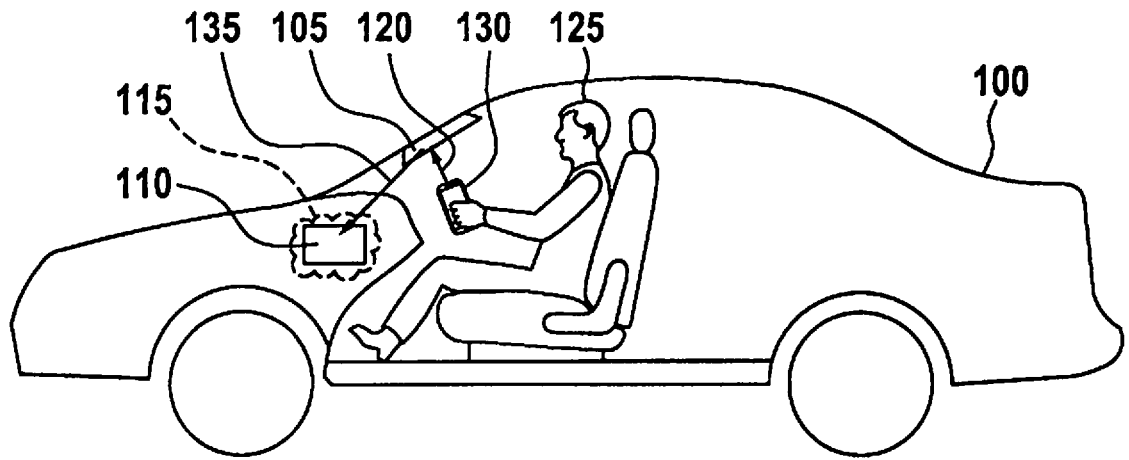
FIG. 1 shows a schematic representation of a vehicle having a device for adapting a triggering algorithm of a personal restraint device, according to an exemplary embodiment.

In the following description of advantageous exemplary embodiments of the present approach, identical or similar reference characters are used for elements shown in the various Figures and having similar function, and repeated description of these elements is omitted.

If an exemplary embodiment has an "and/or" linkage between a first feature and a second feature, this is to be read as meaning that according to a first specific embodiment the exemplary embodiment has both the first feature and the second feature, and according to another specific embodiment the exemplary embodiment has either only the first feature or only the second feature.

FIG. 1 shows a schematic representation of a vehicle 100 having a device 105 for adapting a triggering algorithm 110 of a personal restraint device 115 according to an exemplary embodiment.

Device 105 is situated on vehicle 100 in this exemplary embodiment.

Device 105 is designed to read in at least one object signal 120 that represents a recognition of a mobile object 130 situated in the area of a person 125 in vehicle 100 during a trip. Moreover, device 105 is designed to output a control signal 135, using object signal 120, which control signal is designed to modify triggering algorithm 110 of personal restraint device 115.

Features described in the following are optional. According to this exemplary embodiment, vehicle 100 is realized as an automated vehicle 100 that is driven along a street or roadway at least partially without interaction or controlling by a driver, here person 125, of vehicle 100.

According to this exemplary embodiment, mobile object 130 is a mobile telephone held by person 125.

According to this exemplary embodiment, device 105 has an interior compartment camera that reads in object signal 120.

According to this exemplary embodiment, personal restraint device 115 is an airbag.

Figure 2:
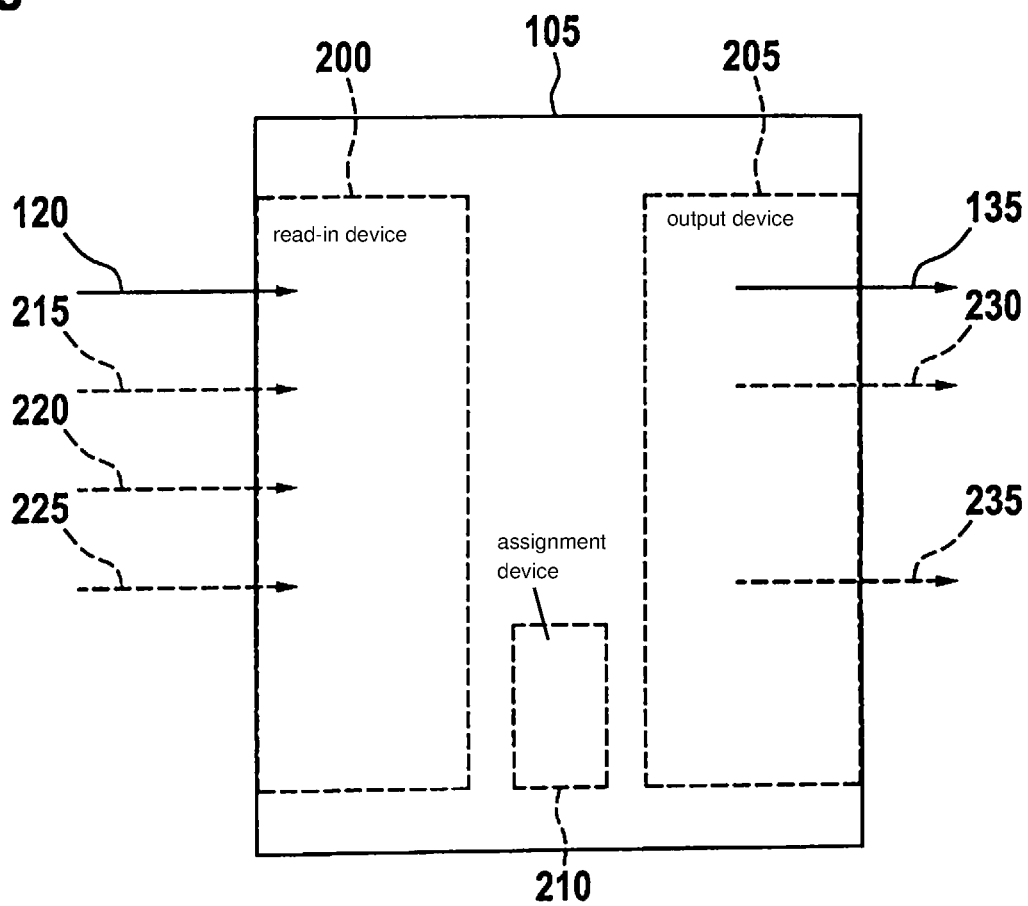
FIG. 2 shows a schematic representation of a device for adapting a triggering algorithm of a personal restraint device of a vehicle, according to an exemplary embodiment.

FIG. 2 shows a schematic representation of a device 105 for adapting a triggering algorithm of a personal restraint device of a vehicle according to an exemplary embodiment. This can be device 105 described on the basis of FIG. 1.

According to this exemplary embodiment, device 105 has at least one read-in device 200 and at least one output device 205. Read-in device 200 reads in at least object signal 120, and output device 205 outputs at least control signal 135. According to this exemplary embodiment, read-in device 200 reads in an object signal 120 that represents a recognition of the mobile object held by the person and/or of a mobile object deposited in the area of an airbag in the vehicle during the trip. According to this exemplary embodiment, object signal 120 is read in by at least one interior compartment camera situated in the vehicle.

Optionally, according to this exemplary embodiment device 105 has an assignment device 210 that is designed to assign to the recognized mobile object at least one position in the vehicle and/or a characteristic, control signal 135 being outputted, which signal is designed to modify the triggering algorithm of the personal restraint device using the position and/or the characteristic.

According to this exemplary embodiment, read-in device 200 moreover optionally receives an accident signal 215, an accident severity signal 220, and an impact type signal 225. According to this exemplary embodiment, output device 205 additionally or optionally outputs a deactivation signal 230 and an information signal 235.

Accident signal 215 represents an impending accident determined by an accident prediction device of the vehicle, and/or an accident time, control signal 135 being outputted using accident signal 215.

Accident severity signal 220 represents a severity, calculated by the accident prediction device, of the impending accident, control signal 135 being outputted, which signal is designed to modify the triggering algorithm of the personal restraint device using accident severity signal 220.

Impact type signal 225 represents an impact type, determined by the accident prediction device, of the impending accident, control signal 135 being outputted, which signal is designed to modify the triggering algorithm of the personal restraint device using the determined impact type. According to an alternative exemplary embodiment, no impact type signal 225 is read in from the accident prediction device, and device 105 has, according to the alternative exemplary embodiment, a determining device that is designed to determine the, or a, impact type of the impending accident using at least one read-in driving parameter signal of the vehicle itself. According to this alternative exemplary embodiment as well, control signal 135 is outputted, which signal is designed to modify the triggering algorithm of the personal restraint device using the impact type determined by the determining device.

According to this exemplary embodiment, control signal 135 is outputted, which signal is designed to suppress a triggering of the personal restraint device, because impact type signal 225 is read in, in which the determined impact type represents an impending accident having an overlap or an angular impact. According to an alternative exemplary embodiment, control signal 135 is outputted, which signal is designed to set an activation threshold of the personal restraint device to be less sensitive in the triggering algorithm of the personal restraint device.

Deactivation signal 230 is designed to deactivate an accident prediction threshold lowering function of the vehicle.

Information signal 235 is outputted in response to control signal 135 and is designed to optically display the modified triggering algorithm on a display device of the vehicle and/or to acoustically reproduce the modified triggering algorithm, in a manner perceptible by the person.

In the following, details of device 105 are again described in other words:

A device 105 presented here enables, through control signal 135, a robust setting of an airbag activation threshold when there is danger from an object, and enables a deactivation of IDF through deactivation signal 230.

Advantageously, in the exemplary embodiment described here, thanks to device 105, the airbag is not triggered during the impending impact, whereby the person, also designated occupant, who is interacting with the object cannot be injured by an object "shot" through the interior compartment of the vehicle. However, in addition to the interaction with the object, the mere presence of the object may also be dangerous, e.g. if the object is deposited on the airbag opening without further interaction.

Accordingly, an aim of device 105 is to adapt the activation threshold for the ignition of the airbag as a function of an interaction with a dangerous object.

For this purpose, the interior compartment camera, or an interior compartment sensor, monitors the interior compartment of the vehicle and recognizes when a person is interacting with an object. According to this exemplary embodiment, in addition to the presence of the object, assignment device 210 ideally also estimates the position and dangerousness of the object, here a weight and/or pointed/corner parts of the object. As long as the person is interacting with the object, the activation threshold for the triggering of the airbag is adapted.

According to this exemplary embodiment, the IDF function of the vehicle is deactivated by deactivation signal 230, in order to prevent a triggering, and thus danger to the person, due to sensitive triggering of the airbag. The activation threshold can here be adapted inversely to the IDF; i.e., if the person is interacting with the object and the object may be dangerous to the person or to some other person if the airbag is triggered, then the threshold can be set to be less sensitive, i.e. more robust. Because, according to this exemplary embodiment, the accident prediction device, also called environment sensor system, in addition recognizes an impending accident or crash that does not exceed a certain level of severity, no airbag is triggered. On the other hand, the airbag would be triggered if a crash severity were to exceed a threshold according to an alternative exemplary embodiment. This has the advantage that less strict requirements are in effect for the crash prediction, and in a case of doubt the airbag can be triggered, for example if the vehicle were to be involved in a severe accident but only a mild accident was predicted. According to a further exemplary embodiment, the triggering of the airbag is completely suppressed by control signal 135, at least for the accident time determined by the accident prediction device. This corresponds to a monitoring of the airbag triggering exclusively on the basis of environmental sensor data, such that in this case the environmental sensor alone can make the decision concerning a suppression of the triggering, independent of the severity. This specific embodiment can be used when the accident prediction is particularly reliable, for example when a plurality of different types of environmental sensors, installed for example in autonomously driving vehicles, all predict a low degree of accident severity independently of each other. According to a further exemplary embodiment, instead of a possible general airbag sensitivity adaptation, the adaptation takes place in airbag-individual fashion in order to offer adequate protection with airbags that are not dangerous.

According to the alternative exemplary embodiment, the airbag system is set to be more robust as soon as the person is interacting with the object, independent of an impending accident. This has the advantage that an adaptation takes place independent of the estimated accident time, so that a triggering can be robustly suppressed. According to an alternative exemplary embodiment, the overall airbag system is suppressed, or the threshold is adapted, for a certain time period. The time corresponds to the predicted accident time, in particular taking into account the tolerance of the prediction. This has the advantage that in the case of an unforeseen accident, protective device can quickly be ignited, because the accident was not correctly estimated. The robust setting is carried out as a function of impact parameters: given an accident that is seen ahead of time to be severe, e.g., a heavy oncoming object with high speed, the system is not made more robust in order to enable a fast reaction. Given a crash that can be seen ahead of time to be mild and/or moderate, the system is set to be robust. In particular in the case of the robust setting as a function of the predicted accident, in the case of a mild/moderate crash, the actual accident is compared with the predicted parameters in order to exclude incorrect predictions. For example, the predicted accident time is compared to the measured time, as takes place in the already-established accident prediction threshold lowering function. The impact position and/or impact angle can also be compared in order to recognize incorrect estimates of an accident, and to set the standard protective measures to be available when there is a large difference between the accident prediction using the environmental sensor system and the ascertaining using contact sensors.

Device 105 can be used in particular during automated driving, because here it can be expected that there will be a higher number of persons interacting with an object that would be dangerous in an accident, so that the number of accidents addressed here increases. However, it is also possible to use device 105 in vehicles that are not driving automatically, because it is already the case today that persons interact with objects. In addition to the environmental sensing already present in IDF, in addition interior compartment sensing is necessary, which carries out the interaction with an object or the assessment of risk due to the object.

According to this exemplary embodiment, the person is informed about a danger of a lack of airbag triggering by information signal 235.

Figure 3:
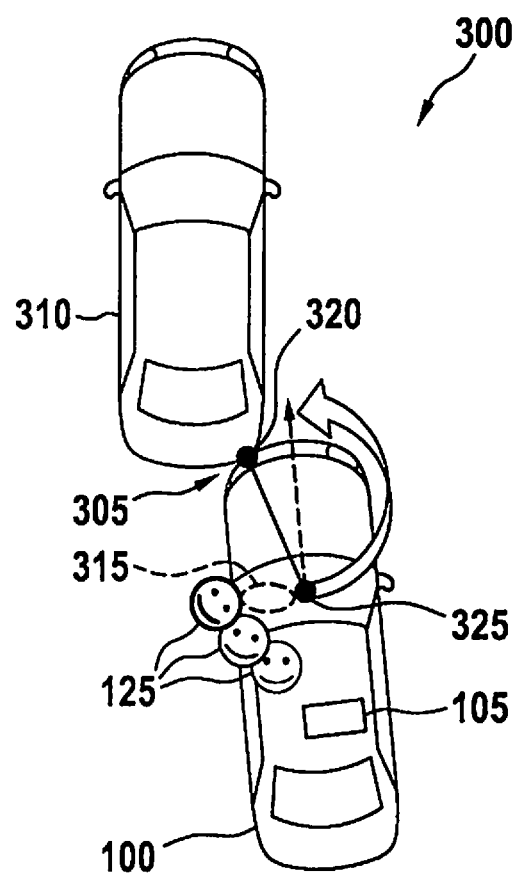
FIG. 3 shows a schematic representation of an accident in which there is an overlap, with a vehicle having a device according to an exemplary embodiment.

FIG. 3 shows a schematic representation of an accident 300 having an overlap 305 with a vehicle 100 having a device 105 according to an exemplary embodiment. This can be vehicle 100 described in FIG. 1, having device 105 described in FIG. 2.

In accident 300 shown here, vehicle 100 and another vehicle 310 run into each other. Visible here is a suppression of airbag 315, given object interaction and an acute accident trajectory in the interior compartment. Thus, according to this exemplary embodiment airbag 315 is not triggered, and is shown only to illustrate how it would be triggered without device 105.

Conventional devices cause an ignition of an airbag when an accident, for example a front crash, exceeds a certain degree of severity. Here, generally, it is irrelevant whether this is an accident with full overlapping, i.e., a full frontal impact, or whether it is an accident having a small or low overlap, or whether it is an angle crash. The front airbag is always ignited, even when person 125 would miss airbag 315 during rotation of vehicle 100, as is shown here.

However, if person 125 is holding the object in front of airbag 315 and airbag 315 is ignited, then person 125 can be injured very seriously, possibly fatally. In addition to the danger to person 125, or the object user, danger to other persons in vehicle 100 due to the object flying around cannot be ruled out. A general suppression of the airbag triggering when person 125 is interacting with an object is frequently certainly too strict, because there are situations in which, despite the danger presented by the object, protection by airbag 315 would be useful to person 125.

According to this exemplary embodiment, an environmental sensor of the accident prediction device of vehicle 100 has recognized the other traffic participants, in this case further vehicle 310, and accident 300 has been predicted. Using parameters such as the type of the other party to the accident, e.g., compact car/SUV/transporter/truck, relative speed, estimated mass, estimated rigidity, impact position, geometry of the other party, degree of overlap, and/or impact angle, it has been estimated how accident 300 will play out, and all this information is provided to device 105.

Here, from the prediction of accident 300, in particular the situation in the interior compartment of vehicle 100 is evaluated.

In general, device 105 considers a degree of effectiveness for a triggering of airbag 315. If person 125 misses airbag 315, then the effectiveness is low. Generally, person 125 misses airbag 315 if a low overlap accident, as shown here, is impending, and vehicles 100, 310 are set into rotation. This may also be the case in angle crashes.

FIG. 3 shows an example of a low overlap crash in the form of accident 300 having a small overlap 305 with an accident behavior:

Vehicles 100, 310, contacting one another, move into rotation about a point of contact 320. Vehicle 100, moving towards the top, is rotated counterclockwise, and here there takes place a rotation of center of gravity 325 as if around a rigid axis at point of contact 320. The head of person 125 is modeled as a freely flying mass that, viewed relative to the interior of the vehicle, is moving past the steering wheel to the left. Vehicle 100 is rotating to the right. Person 315 is not protected, or is hardly protected, by airbag 315 when there is a triggering of airbag 315.

Device 105 has recognized the situation and has predicted the behavior of person 125 relative to airbag 315. Device 105 has in addition recognized that person 125 is interacting with the object. A degree of criticality is estimated for the object, in particular with reference to its position relative to airbag 315, which could be ignited. Because the object exceeds a certain weight, which can be ascertained on the basis of a known shape, e.g., tablet or laptop, and here on the basis of the shape of the mobile telephone, and/or because the shape is particularly dangerous, e.g., a thin region having corners, in which a potentially small point of contact can apply a large degree of pressure at a point, the criticality has been rated to be high. Had this been a soft object, for example a piece of clothing that was just purchased and was being examined by person 125, then the criticality would have been rated low. In addition to the characteristic of the object, the position of the object relative to airbag 315 plays a role: because it was determined that, according to this exemplary embodiment, the object could have been accelerated directly in the direction of person 125, the criticality was likewise evaluated as high. However, if, according to an alternative exemplary embodiment, the object could have impacted a person 125 only indirectly, the criticality would be rated as medium, or if the object could not impact a person, e.g., because it was determined that the object would fly past the head of a single person 125, then the criticality would be rated as low.

Because in the concrete accident scenario depicted here the effectiveness of airbag 315 for person 125 was low, i.e., person 125 misses airbag 315, and at the same time the criticality in the case of an ignition of airbag 315 was high, i.e., the object could impact person 125, the corresponding airbag 315 was not ignited, or the triggering of airbag 315 was suppressed by device 105.

Expressed generally, device 105 is accordingly designed to suppress an ignition of an airbag 315 when device 105 recognizes that a person 125 is interacting with an object and, during an accident, person 125 would miss airbag 315. Here, "missing" can also denote an off-center impact with airbag 315, for example sliding off.

Here, device 105 is designed to separately consider or control a plurality of persons 125 with airbags 315 assigned to each of them. According to an alternative exemplary embodiment, device 105 is designed to take into account all persons 125 situated in vehicle 100 per airbag 315 and object; this means a higher computing expense, but also a more precise assessment of the danger.

FIG. 4 shows a flow diagram of a method 400 for adapting a triggering algorithm of a personal restraint device of a vehicle according to an exemplary embodiment. This can be a method 400 that can be carried out by one of the devices described on the basis of one of the other Figures.

Method 400 includes at least one step 405 of reading in, and a step 410 of outputting. In step 405 of reading in, an object signal is read in that represents a recognition of a mobile object situated in the area of a person in the vehicle during a trip. In step 410 of outputting, a control signal is outputted that is designed to modify the triggering algorithm of the personal restraint device using the object signal.

According to this exemplary embodiment, in step 405 of reading in the object signal is read in, which signal represents a recognition of a mobile object held by the person and/or of a mobile object put down in the area of an airbag in the vehicle during the trip.

According to this exemplary embodiment, in step 405 of reading in the object signal is read in using a, or by at least one, interior compartment camera situated in the vehicle.

According to this exemplary embodiment, in step 410 of outputting the control signal is outputted, which is designed to suppress a triggering of the personal restraint device at least for a period of time. According to an alternative exemplary embodiment, in step 410 of outputting the control signal is outputted, which signal is designed to set an activation threshold of the personal restraint device to be less sensitive in the triggering algorithm of the personal restraint device.

Optionally, according to this exemplary embodiment method 400 moreover has a step 415 of assigning, a step 420 of receiving, a step 425 of further receiving, a step 430 of further reading in, a step 435 of deactivating, and a step 440 of informing.

Step 415 of assigning is carried out in response to step 405 of reading in; in step 415 of assignment at least one position in the vehicle and/or a characteristic is assigned to the recognized mobile object, the control signal being outputted in step 410 of outputting, said control signal being designed to modify the triggering algorithm of the personal restraint device using the position and/or the characteristic.

In step 420 of receiving, an accident signal is received that represents an impending accident determined by an accident prediction device and/or that represents an accident time, step 410 of outputting being carried out using the accident signal.

In step 425 of further receiving, an accident severity signal is received that represents a calculated severity of the impending accident, the control signal being outputted in step 410 of outputting, the control signal being designed to modify the triggering algorithm of the personal restraint device using the accident severity signal.

In step 430 of further reading in, an impact type signal is read in that represents a particular impact type of the impending accident, the control signal being outputted in step 410 of outputting, which control signal is designed to modify the triggering algorithm of the personal restraint device using the determined impact type. Alternatively to step 430 of further reading in, method 400 has, according to an alternative exemplary embodiment, a step of determining in which an impact type of an impending accident is determined using at least one read-in driving parameter signal of the vehicle.

According to this exemplary embodiment, in step 410 of outputting the control signal is outputted, which signal is designed to suppress a triggering of the personal restraint device if, in step 430 of further reading in, an impact type signal is read in, in which the determined impact type represents an impending accident having an overlap or an angular impact, or if, in the step of determining, an impact type is determined that represents an impending accident having an overlap or an angular impact.

In step 435 of deactivating, an accident prediction threshold lowering function of the vehicle is deactivated.

In step 440 of informing, in response to step 410 of outputting, an information signal is outputted of the modified triggering algorithm, for optical display and/or acoustic reproduction so as to be perceivable by the person.

The method steps presented here can be carried out in repeated fashion, as well as in a sequence differing from that described.

What is claimed is:

1. A method for adapting a triggering algorithm of a personal restraint device of an automated vehicle, the method comprising:
   reading in an object signal that represents a recognition of a mobile object situated in an area of a person in the vehicle during a trip;
   outputting a control signal that is for modifying the triggering algorithm of the personal restraint device using at least the object signal; and
   assigning to the recognized mobile object, in response to the reading in: (i) at least one position in the vehicle, and (ii) a characteristic, wherein the control signal is output in the outputting, and wherein the control signal modifies the triggering algorithm of the personal restraint device using the at least one position and the characteristic assigned to the recognized mobile object, wherein the characteristic includes an estimated danger of the object based on a weight of the object and pointed or corner parts of the object;
   wherein an activation threshold for the triggering of the personal restraint device is adapted when the person is interacting with the mobile object.

2. The method as recited in claim 1, wherein, in the reading in, the object signal is read in, which signal represents one of: (i) the recognition of the mobile object held by the person, or (ii) the recognition of the mobile object deposited in an area of an airbag in the vehicle during the trip.

3. The method as recited in claim 1, wherein, in the reading in, the object signal is read in using at least one interior compartment camera situated in the vehicle.

4. The method as recited in claim 1, wherein, in the outputting, the control signal is outputted, the control signal setting the activation threshold of the personal restraint device to be less sensitive in the triggering algorithm of the personal restraint device.

5. The method as recited in claim 1, wherein, in the outputting, the control signal is outputted, the control signal suppressing a triggering of the personal restraint device at least for a period of time.

6. The method as recited in claim 1, further comprising:
   receiving an accident signal that one of: (i) represents an impending accident determined by an accident prediction device, or (ii) represents an accident time, the outputting step being carried out using the accident signal.

7. The method as recited in claim 1, further comprising:
   receiving an accident severity signal that represents a calculated degree of severity of an impending accident, the control signal being outputted in the outputting, the control signal modifying the triggering algorithm of the personal restraint device using the accident severity signal.

8. The method as recited in claim 1, further comprising:
   deactivating an accident prediction threshold lowering function of the vehicle.

9. The method as recited in claim 1, further comprising:
   performing one of:
   determining an impact type of an impending accident using at least one read-in driving parameter signal of the vehicle; or
   further reading in of an impact type signal that represents a particular impact type of an impending accident, the control signal, wherein in the outputting, wherein the control signal modifies the triggering algorithm of the personal restraint device using the determined impact type.

10. The method as recited in claim 9, wherein, in the outputting, the control signal is outputted, the control signal preventing the triggering of the personal restraint device if one of: (i) in the determining, the impact type is determined that represents an impending accident having one of an overlap or an angular impact, or (ii) in the further reading in, the impact type signal is read in in which the determined impact type represents an impending accident having one of an overlap, or an angular impact.

11. The method as recited in claim 1, further comprising:
    informing, in which, in response to the outputting, at least one of an information signal for optical display, and an acoustic reproduction of the modified triggering algorithm, is outputted.

12. The method of claim 1, wherein the mobile object includes a mobile phone.

13. An apparatus for adapting a triggering algorithm of a personal restraint device of an automated vehicle, comprising:
    a read-in device, including an interior compartment camera, to read in an object signal that represents a recognition of a mobile object situated in an area of a person in the vehicle during a trip;
    an output device to output a control signal to modify the triggering algorithm of the personal restraint device using at least the object signal; and
    an assignment device to assign to the recognized mobile object, in response to the reading in: (i) at least one position in the vehicle, and (ii) a characteristic, wherein the control signal is output in the outputting, and wherein the control signal modifies the triggering algorithm of the personal restraint device using the at least one position and the characteristic assigned to the recognized mobile object, wherein the characteristic includes an estimated danger of the object based on a weight of the object and pointed or corner parts of the object;
    wherein an activation threshold for the triggering of the personal restraint device is adapted when the person is interacting with the mobile object.

14. The apparatus of claim 13, wherein the mobile object includes a mobile phone.

15. A non-transitory machine-readable storage medium, on which is stored a computer program, which is executable by a processor, comprising:
- a program code arrangement having program code for adapting a triggering algorithm of a personal restraint device of an automated vehicle, by performing the following:
  - reading in an object signal that represents a recognition of a mobile object situated in an area of a person in the vehicle during a trip;
  - outputting a control signal to modify the triggering algorithm of the personal restraint device using at least the object signal; and
  - assigning to the recognized mobile object, in response to the reading in: (i) at least one position in the vehicle, and (ii) a characteristic, wherein the control signal is output in the outputting, and wherein the control signal modifies the triggering algorithm of the personal restraint device using the at least one position and the characteristic assigned to the recognized mobile object, wherein the characteristic includes an estimated danger of the object based on a weight of the object and pointed or corner parts of the object;
  - wherein an activation threshold for the triggering of the personal restraint device is adapted when the person is interacting with the mobile object.

16. The storage medium of claim 15, wherein the mobile object includes a mobile phone.

\* \* \* \* \*